United States Patent
Parenteau et al.

(10) Patent No.: US 6,547,333 B2
(45) Date of Patent: Apr. 15, 2003

(54) METHOD AND APPARATUS FOR AN ADJUSTABLE SAFETY SYSTEM FOR A VEHICLE

(75) Inventors: Chantal S. Parenteau, Troy, MI (US); Madana Gopal, Troy, MI (US); Allen Richard Starner, Springboro, OH (US); Minoo Jaswantlal Shah, Farmington Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 41 days.

(21) Appl. No.: 09/848,603

(22) Filed: May 3, 2001

(65) Prior Publication Data

US 2002/0163243 A1 Nov. 7, 2002

(51) Int. Cl.7 .................................................. A47C 7/36
(52) U.S. Cl. ........................................ 297/397; 297/473
(58) Field of Search ................................ 297/391, 397, 297/464, 485, 483, 473

(56) References Cited

U.S. PATENT DOCUMENTS

| | | | | |
|---|---|---|---|---|
| 4,348,037 A | * | 9/1982 | Law et al. | |
| 4,790,601 A | * | 12/1988 | Burleigh et al. | |
| 4,854,639 A | * | 8/1989 | Burleigh et al. | |
| 5,330,228 A | * | 7/1994 | Krebs et al. | |
| 5,379,725 A | | 1/1995 | Roberson et al. | 119/770 |
| 5,390,982 A | * | 2/1995 | Johnson et al. | |
| 5,486,037 A | * | 1/1996 | Harper | |
| 5,613,736 A | * | 3/1997 | Schaked et al. | |
| 5,678,887 A | * | 10/1997 | Sher | |
| 5,730,499 A | * | 3/1998 | Salisbury, Jr. | |
| 5,829,841 A | * | 11/1998 | Pywell et al. | |
| 5,979,991 A | * | 11/1999 | Lewandowski et al. | |
| 6,101,979 A | | 8/2000 | Wilson et al. | 119/725 |
| 6,123,389 A | * | 9/2000 | O'Connor et al. | |
| 6,394,554 B1 | * | 5/2002 | Hingle | |

* cited by examiner

Primary Examiner—Milton Nelson, Jr.
(74) Attorney, Agent, or Firm—Kathryn A. Marra

(57) ABSTRACT

A safety system for a vehicle, having an adjustable headrest with a belt guide. The belt guide realigns the path of travel of a torso belt of a vehicle. The adjustable headrest provides head support to smaller sized passengers while also positioning the torso belt for the smaller sized passenger.

17 Claims, 11 Drawing Sheets

METHOD AND APPARATUS FOR AN ADJUSTABLE SAFETY SYSTEM FOR A VEHICLE

BACKGROUND OF THE INVENTION

This invention relates to a safety system for a vehicle, and more particularly, to an adjustable safety system for use with vehicle occupants of varying sizes and conditions.

The safety of occupants in vehicles is a continuing concern. Because of this concern, and of governmental regulations, there have been a large number of technical advances relating to safety seat systems for vehicles. However, not all occupants fit into the designed seats and/or safety car seats.

More specifically, occupants that are too big for child seats and/or booster seats may not be large enough to benefit from the full protection of a safety system designed for larger adult occupants.

SUMMARY OF THE INVENTION

A safety system for a vehicle that includes an adjustable headrest having a belt guide, the belt guide repositions a torso belt as the adjustable headrest is repositioned.

A safety device having an adjustable headrest movably mounted to a vehicle seat. The adjustable headrest includes a belt guide portion for repositioning the path of travel of a torso belt of the vehicle. The repositioning of the torso belt allows the same to traverse the upper body portion of a smaller sized vehicle.

A deployable headrest having a belt guide portion for repositioning the path of travel of a torso belt of the vehicle. The deployable headrest deploys from a headrest location positioned at the top of the vehicle seat.

A safety device for a vehicle occupant, such as an elderly individual or a handicapped individual that may require additional restraint, the safety device includes a vest portion to be worn by the vehicle occupant, the vest portion being secured to the vehicle at a plurality of locations, thereby limiting the movement of the restrained occupant.

A safety device for a vehicle occupant such as a dog, or cat, or other pet that may require additional restraint, the safety device includes the vest portion to be worn by the vehicle occupant, and the vest portion is secured to the vehicle at a plurality of locations, thereby limiting the movement of the restrained occupant.

The above discussed and other features and advantages of the present invention will be appreciated and understood by those skilled in the art from the following description and drawings.

DETAILED DESCRIPTION

Figure 1:
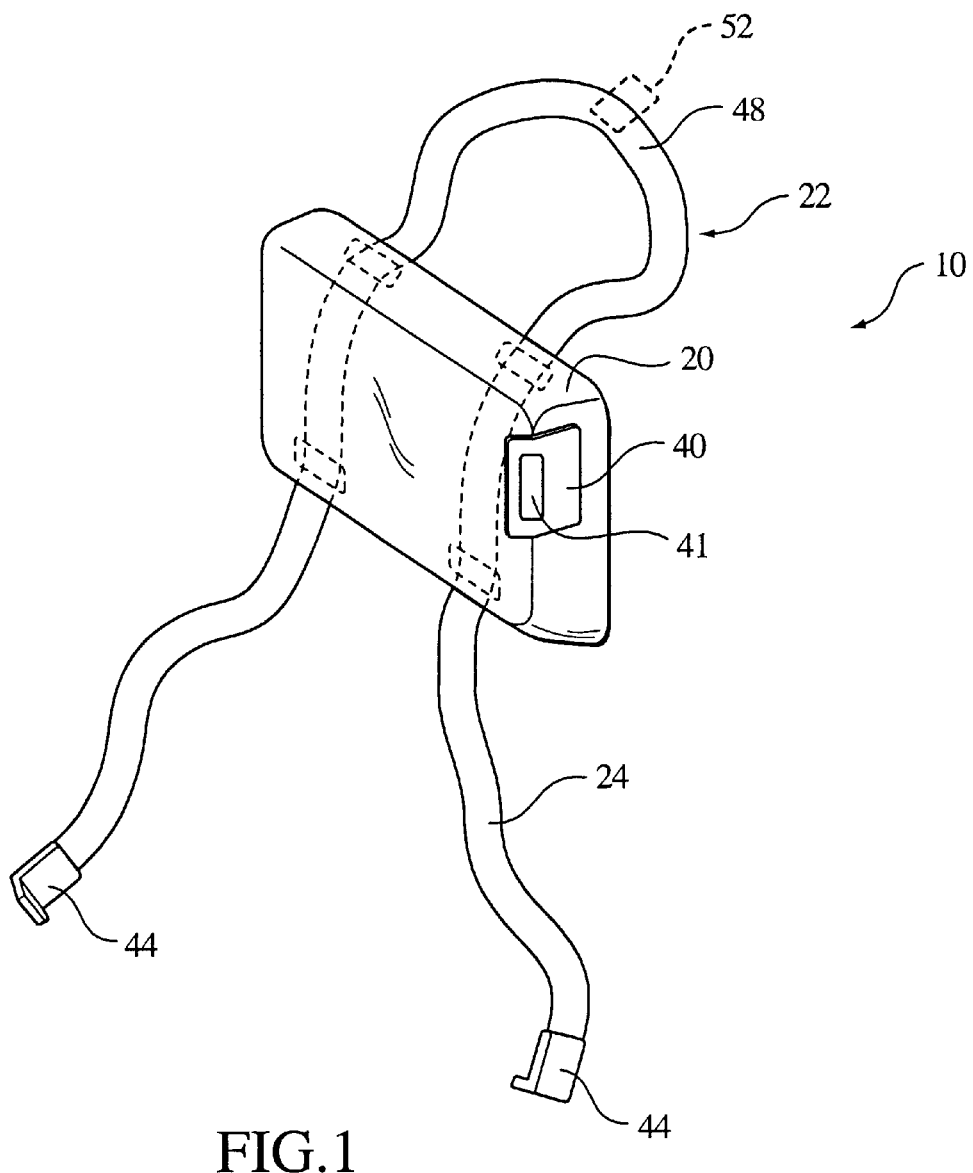
FIG. 1 is a front perspective of a safety system constructed in accordance with an exemplary embodiment of the present invention.

Referring now to FIGS. 1–4, a safety system 10 for use in a vehicle is illustrated. Typically, vehicle seats have a seat back portion 12, a horizontal seat portion 14, a headrest 16, and a seat belt 18 or other safety restraining device.

In accordance with an exemplary embodiment of the present invention, safety system 10 includes an adjustable headrest 20 and a means 22 for movably securing headrest 20 to the vehicle seat. Adjustable headrest 20 is positionable in locations not attainable by headrest 16, since headrest 16 is generally affixed to the upper portion of seat back portion 12 and its adjustablity is typically upward from the position illustrated in FIG. 1. In an exemplary embodiment, securement means 22 is an adjustable nylon strap 24.

Adjustable headrest 20 has a front surface 26, a back surface 28, a top portion, a bottom portion and two side portions 30 and 32. Front surface 26 is padded to provide a cushion for an occupant's head. Back surface 28 of adjustable headrest 20 has two pairs of guide openings 34 and 36. Each pair of openings 34 and 36 is aligned such that strap 24 can pass from top to bottom, or vice versa.

In accordance with an exemplary embodiment, adjustable headrest 20 is of a thickness sufficient enough to provide comfortable support to the vehicle occupant's head.

As an alternative, strap 24 can pass through a pair of elongated openings through the interior of adjustable headrest (as illustrated by the dashed lines in FIG. 1).

The paired openings 34 and 36 of adjustable headrest 20 are designed to receive strap 24. Strap 24 is sized to be smaller than openings 34 and 36 so that adjustable headrest 20 can be moved into various positions with respect to a vehicle seat.

In one embodiment, strap 24 and openings 34 and 36 may be circular to help facilitate the sliding of headrest 20 along strap 24. Of course, other configurations of strap 24 and openings 34 and 36 are contemplated for use with the present invention.

Side portion 30 of adjustable headrest 20 includes a belt guide 40. Belt guide 40 may be positioned on either side of adjustable headrest 20 to accommodate either a passenger or driver's side seat belt configuration. Alternatively, belt guide 40 is centrally positioned on the side portion of headrest 20, and headrest 20 can simply be removed from strap 24, rotated and placed back on strap 24, effectively placing belt guide 40 on the opposite end. This allows safety system 10 to be applied to either the driver or passenger side seat.

Figure 5:
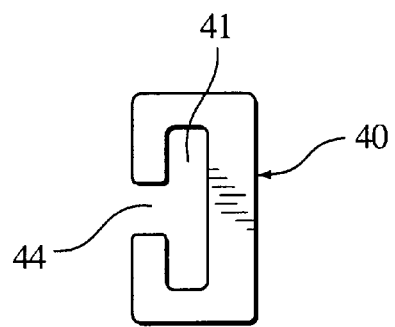
FIG. 5 is a view of an alternative belt guide for use with the adjustable headrest.
Figure 2:
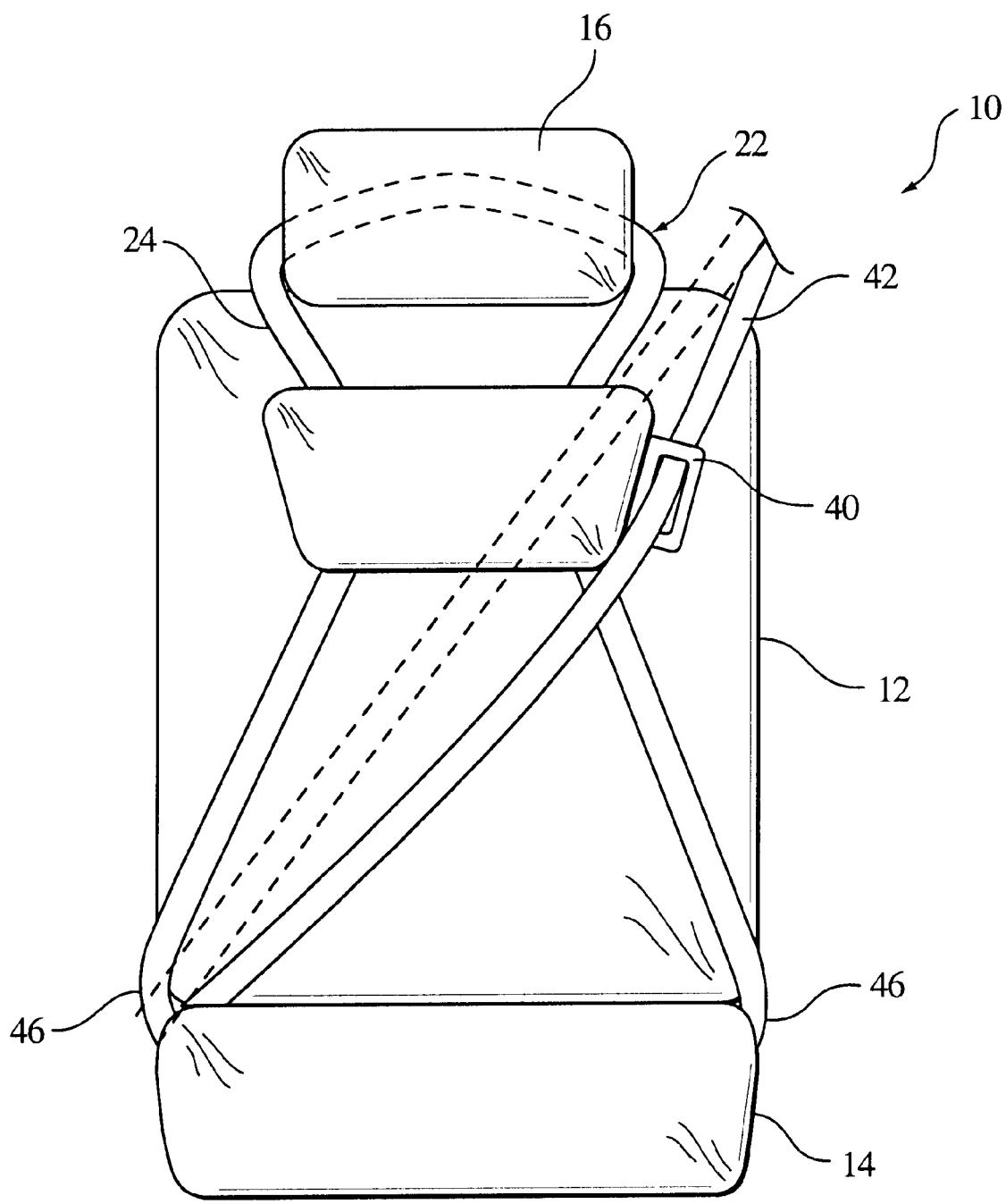
FIG. 2 is a front view of the adjustable headrest mounted to a vehicle seat.
Figure 3:
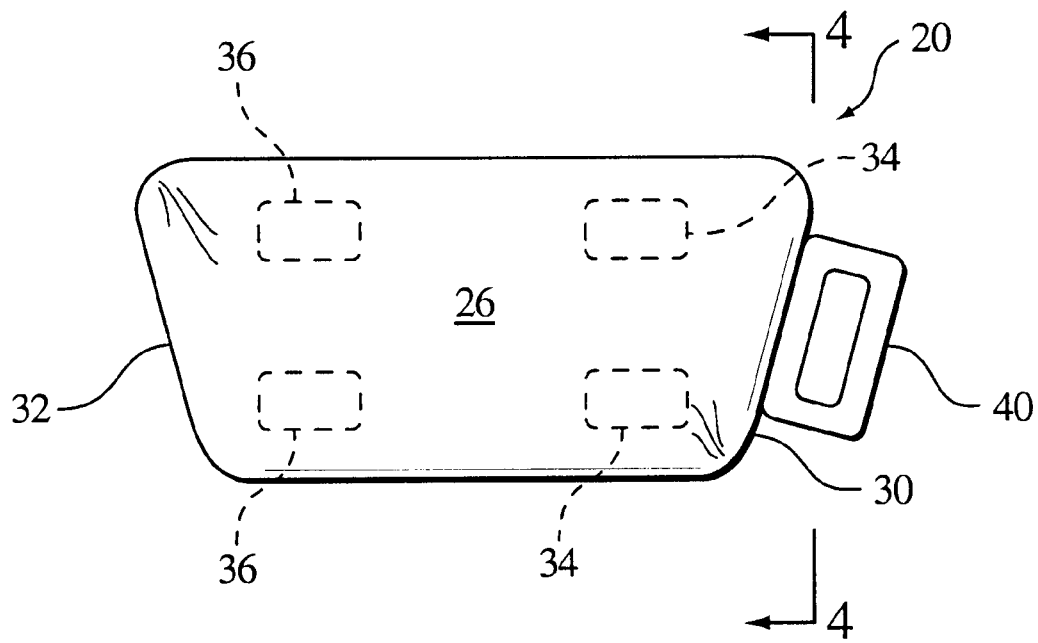
FIG. 3 is a front view of the adjustable headrest.
Figure 4:
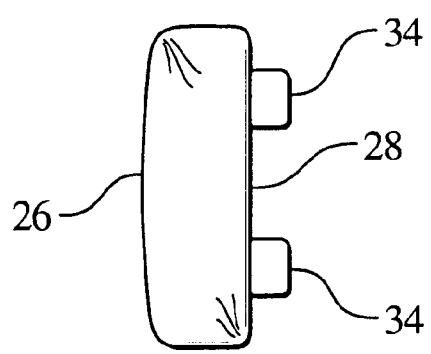
FIG. 4 is a view along lines 4—4 of FIG. 3.

Belt guide 40 provides a means for realigning a torso belt 42. Belt guide 40 is configured to allow a portion of torso belt 42 to pass through the opening of belt guide 40. Belt guide 40 is configured to have a central opening 41, or alternatively, a channel with a reduced opening 43 to allow the insertion of torso belt 42 while also providing a guiding means, as illustrated in FIG. 5. In an exemplary embodiment, the channel is large enough to accommodate torso belt 42 while reduced opening 43 is smaller and prevents torso belt 42 from being dislodged from belt guide 40 once it has been inserted into channel 41. In order to remove and/or insert the torso belt, the user simply manipulates torso belt 42 through reduced opening 43 and once inserted into channel 41 torso belt 42 is expanded out into its normal configuration. The manipulation of torso belt 42 is possible due to the flexible nature of the same. Belt guide 40 is fixedly secured to adjustable headrest and is constructed out of an easily-molded material with a high strength such as plastic, aluminum, and/or steel.

In yet another alternative, belt guide 40 and its corresponding opening may be configured to be integral with the surface of adjustable headrest 20.

In yet another alternative, a belt guide 40 is positioned on both sides of adjustable headrest 20, negating the need to rotate the same.

Figure 10:
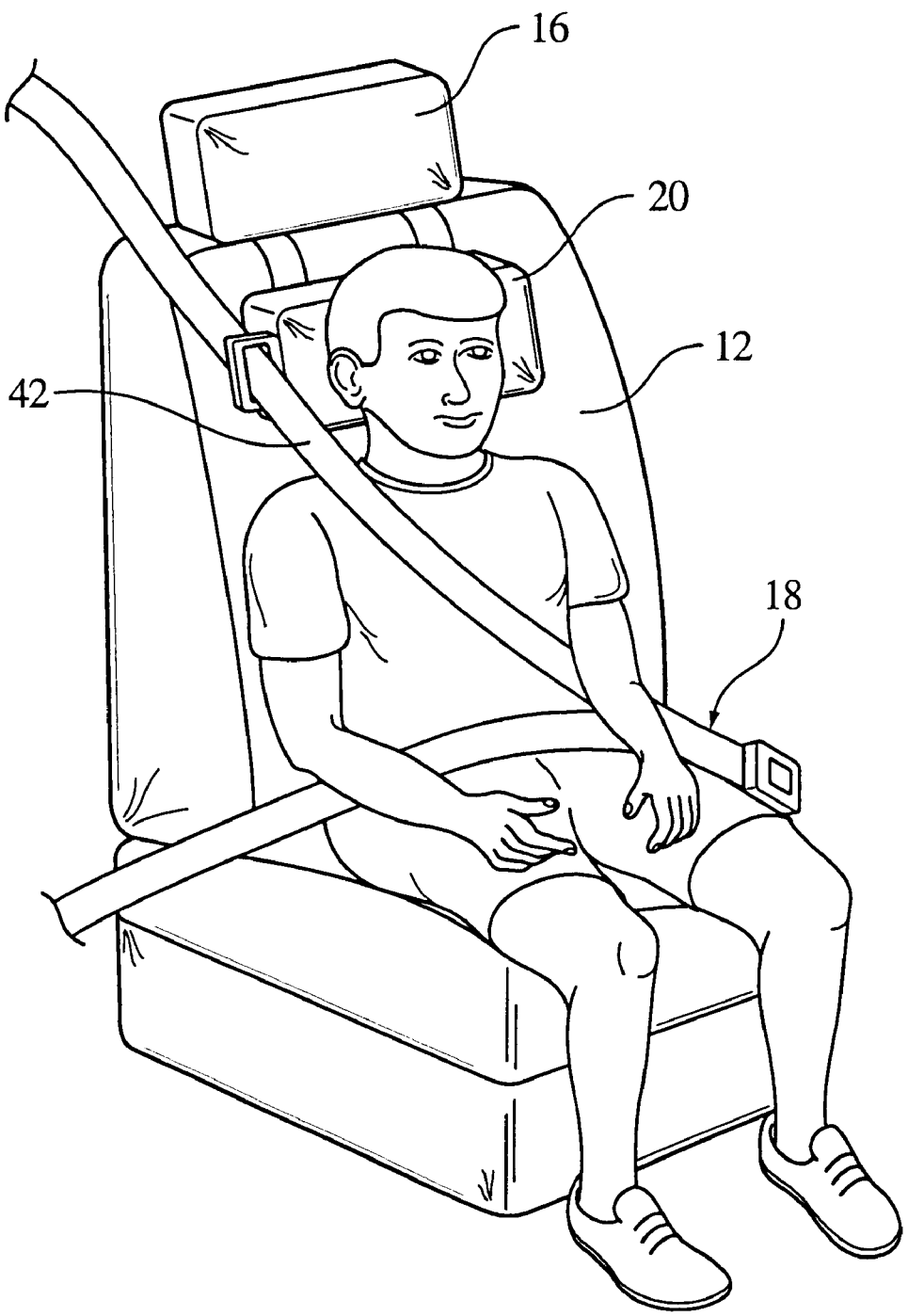
FIG. 10 is a perspective view of an occupant utilizing the safety system of the present invention.

Safety system 10 allows adjustable headrest 20 to be positioned on a vehicle seat corresponding to the particular vehicle occupant. As contemplated in accordance with the present invention, safety system 10 will allow adjustable headrest to be positioned for a smaller sized vehicle occupant, as for example, the child illustrated in FIG. 10.

Accordingly, and after adjustable headrest 20 is positioned to correspond to the intended vehicle occupant, a portion of torso belt 42 is placed within belt guide 40, and torso belt 42 is realigned.

The alignment of torso belt 42 assists in the positioning of a torso belt 42 for an occupant whose head is located at the general location of adjustable headrest 20. (See FIG. 10) Thus, adjustable headrest 20 and belt guide 40 reposition torso belt 42.

In addition, headrest 20 provides support to the smaller sized occupant in addition to realigning the path of travel of torso belt 42. Accordingly, safety system 10 provides a dual function due to the fact that the smaller sized occupant's head is supported, and simultaneously the torso belt is realigned by the adjustable headrest and complementary belt guide.

Moreover, adjustable headrest 20 is easily repositioned to accommodate various occupants of different size since adjustable headrest 20 is slidably secured to strap 24.

Strap 24 has a pair of anchor portions 44 which are affixed to the end portions of strap 24. Anchor portions 44 are secured to a pair of anchor points 46 in the vehicle. Anchor points 46 preferably are located at a position on either side of the vehicle seat and vehicle occupant. For example, anchor points 46 may be provided by anchors, which are standard anchoring points installed in vehicles and may correspond to the preferred locations.

The proposed child restraint attachment system uses two lower fixed anchorages in conjunction with a top tether. The lower anchorages are intended to be located in the seat bight line (i.e. the region of intersection of the surfaces of the seat cushion and the seat back). Such lower anchorages are intended to be used with tether hooks, small push-button buckles, or other type of connecting means.

Alternatively, anchor portions 44 may be secured to the seatbelt anchors 18 which typically are located on either side of the occupant to be restrained by the seatbelt.

Figure 11:
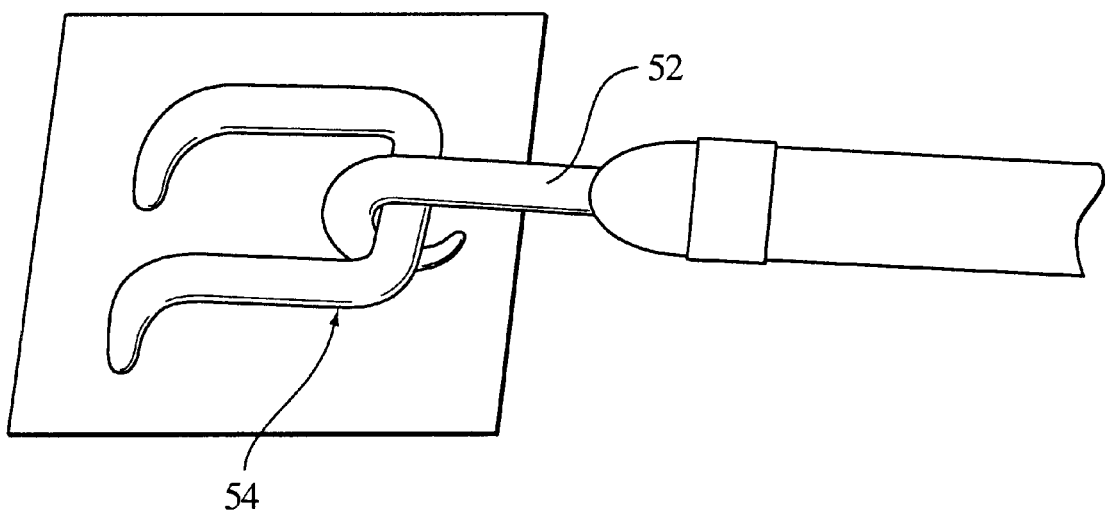
FIG. 11 illustrates a securement member.

Strap 24 also defines an upper loop portion 48 which depends upwardly from adjustable headrest 20. In an exemplary embodiment, upper loop portion 48 is positioned over headrest 16 and is secured to the vehicle at an upper securement point 50. One example of an upper securement point 50 may also be an Isofix anchor. Alternatively, a buckle or hook 52 can be secured to upper loop portion 48. Buckle or hook 52 is configured to be secured to the Isofix anchor or another means of securement such as an anchor point 54 as illustrated in FIG. 11. In yet another alternative embodiment, upper loop portion 48 is wrapped around headrest 16 or the supports for headrest 16, and as strap 24 is tightened, upper loop portion 48 will wrap around headrest 16.

In one embodiment, adjustable headrest 20 is repositioned by sliding headrest 20 along strap 24. Alternatively, strap 24 is made of an elastic polymer that provides tautness and allows for easy repositioning. Thus, the semi-rigid quality of strap 24 provides a tautness that effectively prevents free movement of adjustable headrest 20. Strap 24 is also configured to be adjustable to allow safety system 10 to be installed on vehicle seats of varying sizes. For example, strap 24 may be adjustable at anchor portions 44.

Figure 6:
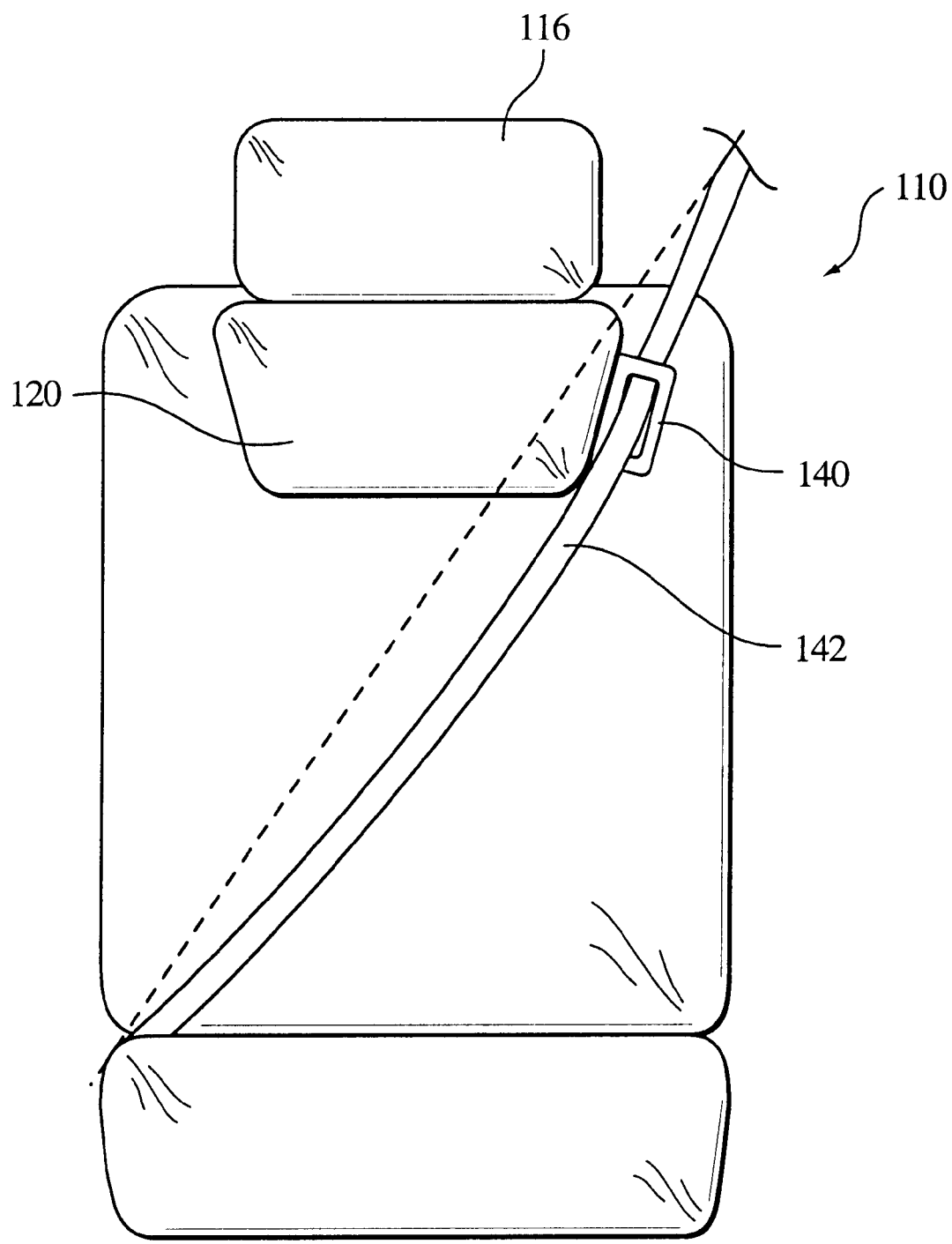
FIG. 6 is a front view of an alternative embodiment of the present invention.
Figure 7:
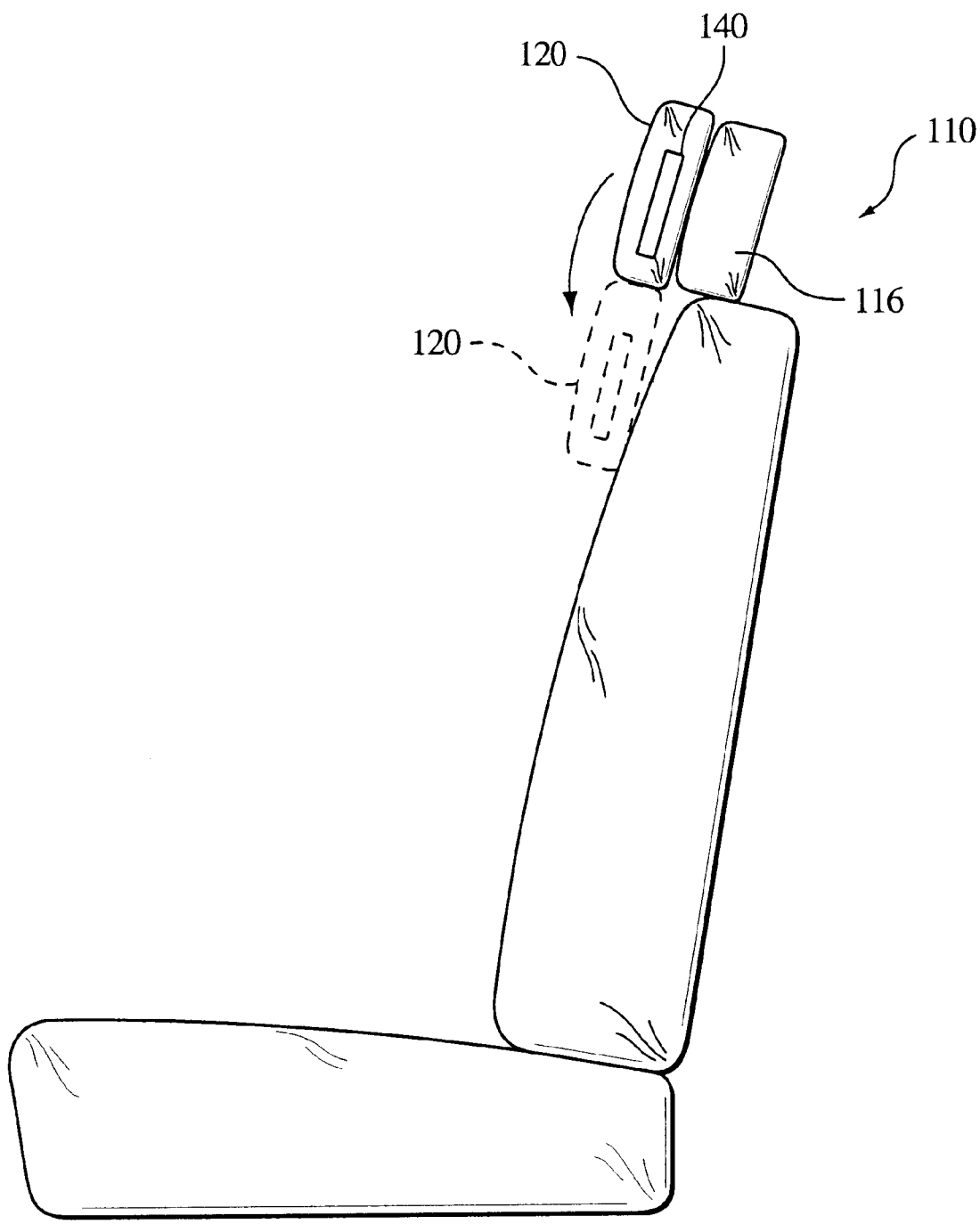
FIG. 7 is a side view of the FIG. 6 embodiment.

Referring now to FIGS. 6 and 7, an alternative embodiment of the present invention is illustrated. Here, component parts performing similar or analogous functions are labeled in multiples of 100.

Here, an existing headrest 116 is modified or replaced to include a deployable portion 120. Deployable portion 120 includes a belt guide 140 which repositions a torso belt 142 when deployable portion 120 is in the configuration illustrated in FIG. 6.

This feature allows deployable portion 120 to be stowed in an undeployed position (FIG. 7) and is easily deployed to the position illustrated by the dashed lines in FIG. 7. The stowed position will resemble a typical vehicle headrest. This will provide an aesthetically pleasing appearance when there is no requirement for deployable portion 120. Deployable portion 120 is kept in its undeployed position by a securement means such as Velcro, wherein one side of deployable portion 120 is adhered to a portion of headrest 116. Alternatively, securement straps or a latch can be employed to maintain deployable portion in its stowed position.

Similar to the embodiment illustrated in FIGS. 1–4, when deployable portion 120 is in its deployed position, belt guide 140 realigns a torso belt 142.

Figure 8:
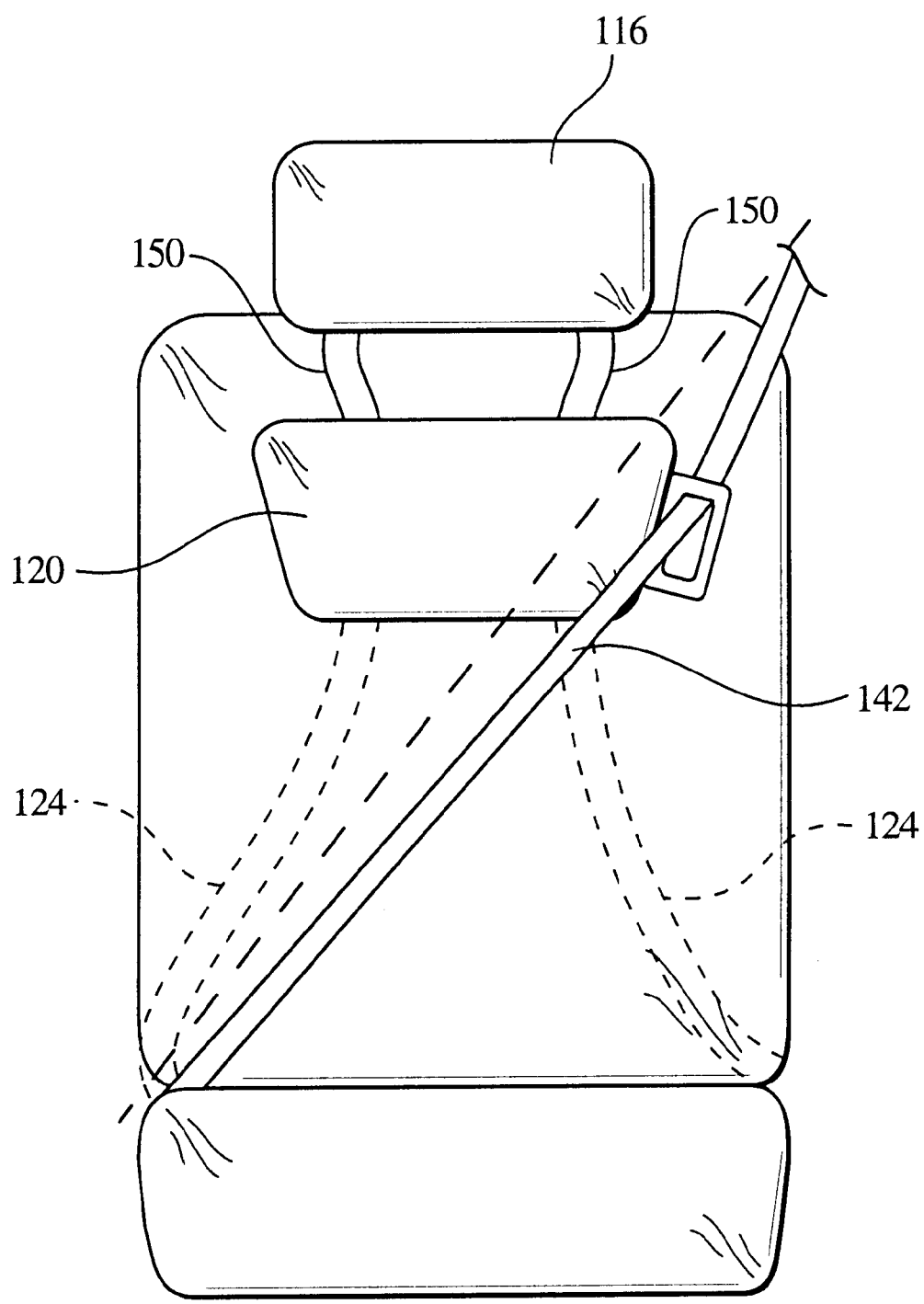
FIG. 8 is a front view of another alternative embodiment of the present invention.
Figure 9:
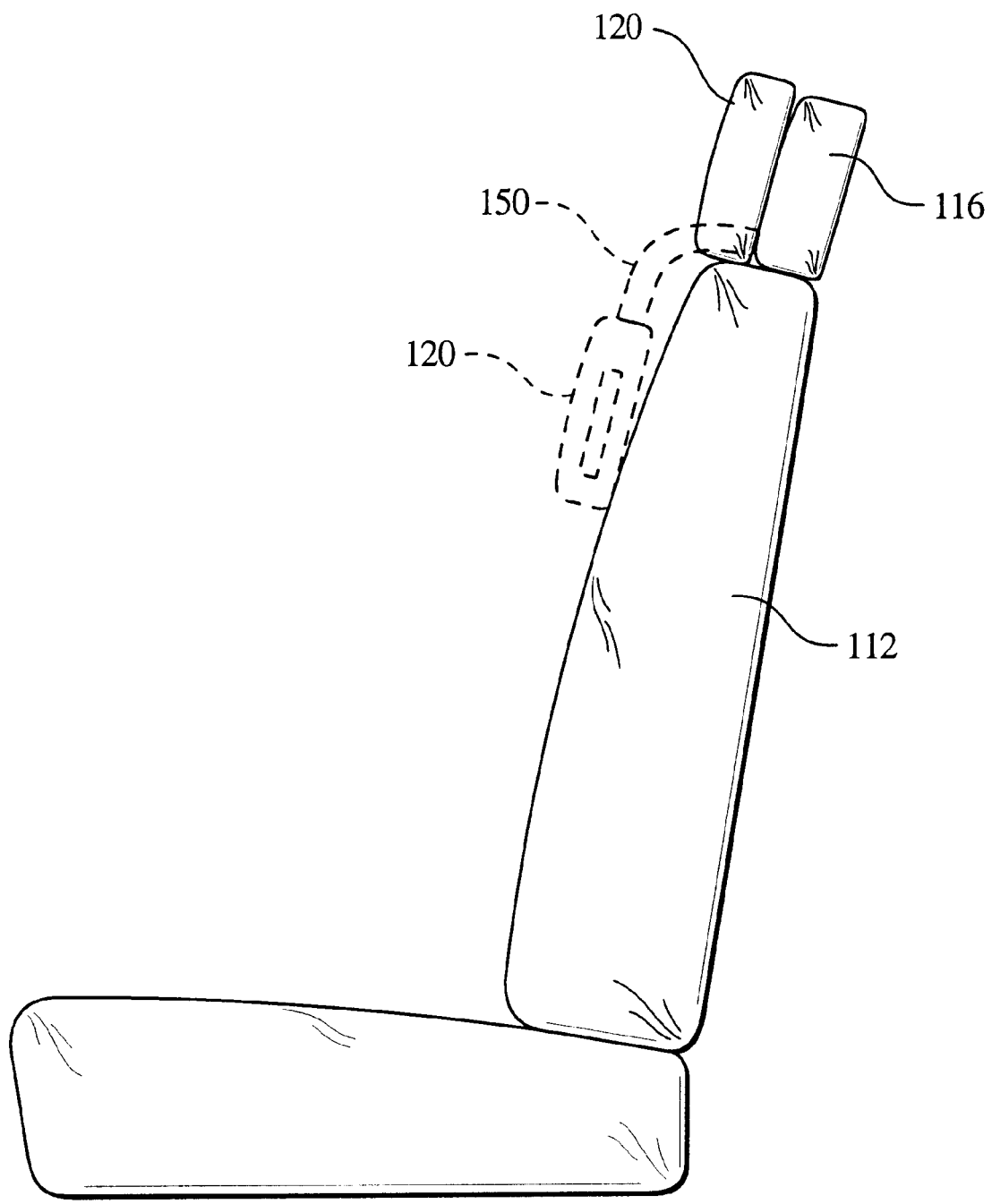
FIG. 9 is a side view of the FIG. 8 embodiment.

Referring now to FIGS. 8 and 9, another alternative embodiment of the present invention is illustrated. Here, deployable portion 120 is secured to headrest 116 by a pair of straps 150. Straps 150 allow deployable portion 120 to deploy at a position further away from headrest 116 in order to allow for greater displacement of torso belt 142 which would correspond to a smaller sized occupant. In addition, strap portions 150 allow deployable portion 120 to be flush with seat back portion 112 when deployable portion 120 is in its undeployed or stowed position as illustrated in FIG. 9.

In addition, and as yet another alternative embodiment, strap portions 150 may be adjustable to allow further deployment of deployable portion 120.

In yet another alternative, deployable portion 120 is configured to have a strap portion 124, with a pair of anchor portions 144 that are affixed to anchor points 146. This would allow deployable portion 120 to be taughtly secured to the vehicle seat once it is in its deployed position.

Figure 12:
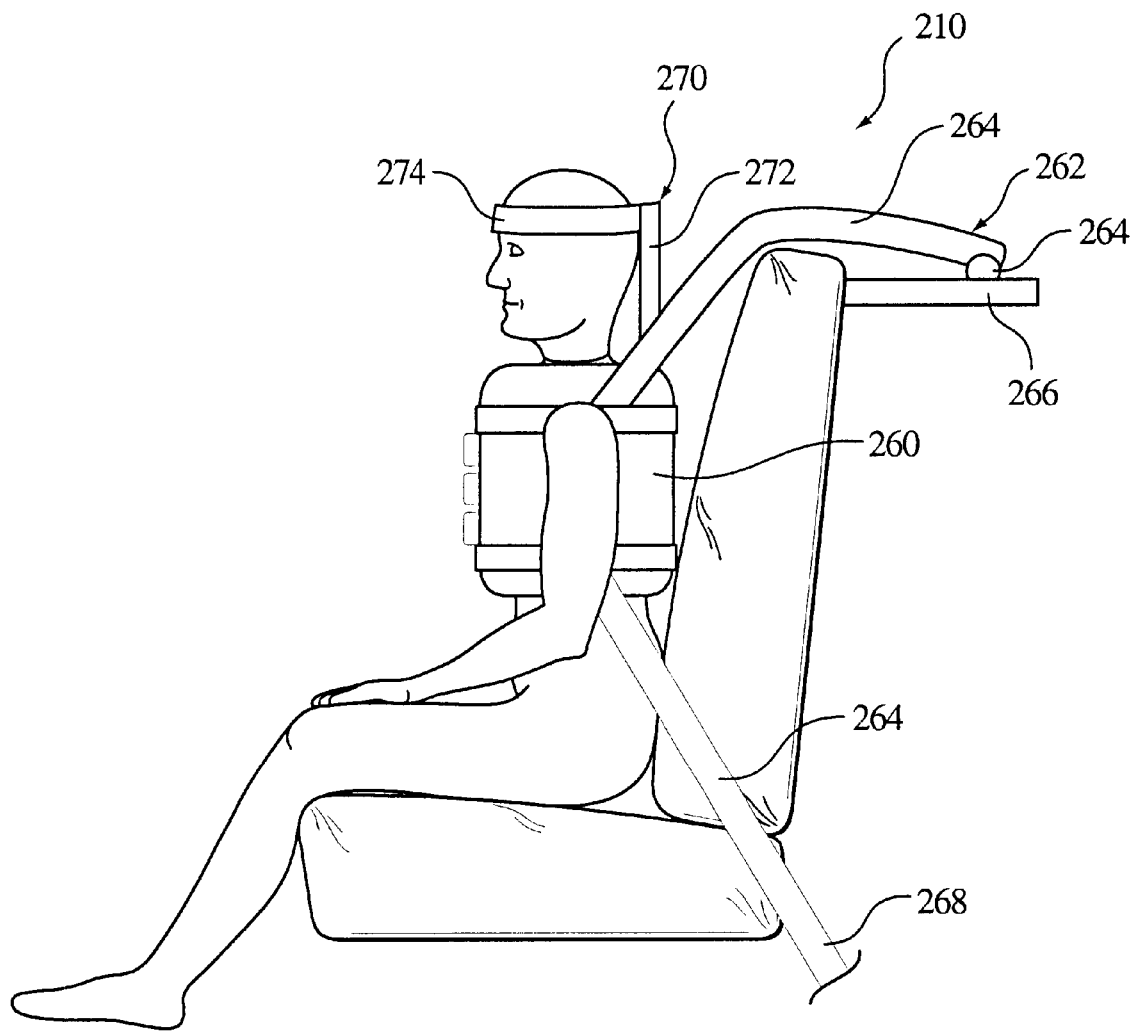
FIG. 12 is a side view of another alternative embodiment.
Figure 13:
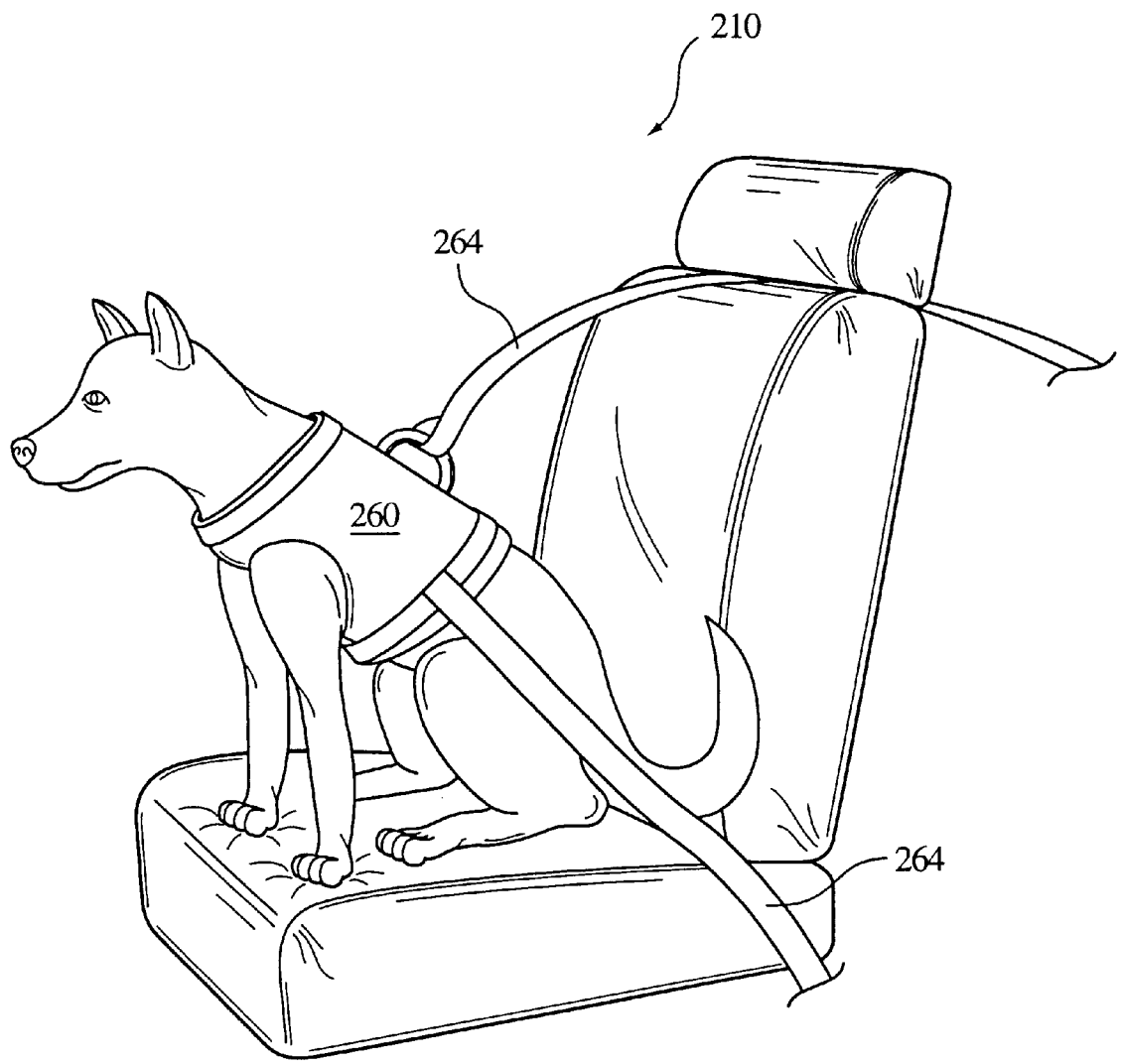
FIG. 13 is a side view of yet another alternative embodiment.

Referring now to FIGS. 12 and 13, yet another alternative embodiment is illustrated. Here, safety system 210 includes a vest or jacket 260 which is configured to be worn by a vehicle passenger such as a child, older passenger, handicapped person, or animal. In one embodiment, vest 260 is provided with additional cushioning, such as padding. Alternatively, vest 260 is a nylon jacket with a buckling means for securing and removing vest 260 from the vehicle occupant. Vest 260 is secured to a safety harness system 262 which will have three tethers 264 to secure it to the vehicle seat. One tether will provide upper securement at a point 266, and the remaining two tethers will provide lower securement at a pair of points 268 located at either side of the vehicle seat.

Vest 260 will disperse the loads of the restraining system over a larger surface area which may minimize localized injuries caused by a single restraining belt such as a torso belt which is a concern for elderly vehicle occupants that are more susceptible to injury.

Safety harness system 262 is adjustable to accommodate passengers of varying sizes. In addition, safety harness system 262 can be adapted and used for restraining objects within the vehicle. For example, a fragile object may be secured by safety harness system 262 to prevent movement of the same during transport.

As an alternative, and referring in particular to FIG. 12, and in order to provide additional restraint to a passenger that may need additional support for their head (e.g. handicapped or injured individual), a head support system 270 is secured to vest 260. Head support system 270 includes a rod 272 which is linked to the vest 260 and can slide upwardly. For example, rod 272 can be received within an elongated opening in vest 260. Rod 272 is also secured to an adjustable halo 274. In an exemplary embodiment, rod 272 is a plastic rod which deploys upwardly away from vests 260. Halo 274 is adjustable to accommodate passengers of different sizes. Rod 272 is designed to run parallel to the passenger's spine, thus properly aligning their head. Rod 272 is fixedly secured to back portion of vest 260. Halo 274 is secured to one end of the rod 272 (the end nearest to the occupant's head).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A belt directing device for use with a smaller sized occupant or child in a vehicle having a seat with a headrest and a torso belt positioned for use with a vehicle occupant positioned on the seat, the belt directing device, comprising:
   an adjustable headrest having a belt guide, said belt guide being positioned to realign a path of travel of the torso belt when the torso belt is received within said belt guide; and
   a means for slidably securing said adjustable headrest to the seat, wherein said adjustable headrest is repositionable with respect to the seat and the headrest, said belt guide providing multiple positions for realigning the torso belt as said adjustable headrest is repositioned with respect to the seat and the headrest.

2. The belt directing device as in claim 1, wherein said means for slidably securing said adjustable headrest is an adjustable strap being slidably received within a plurality of openings positioned on a back surface of said adjustable headrest, said back surface facing the seat when said adjustable headrest is slidably secured thereto.

3. The belt directing device as in claim 2, wherein said adjustable strap further comprises a first securement end and a second securement end, said adjustable strap defining a loop portion, said loop portion depending away from one end of said adjustable headrest and said first securement end and said second securement end depending away from another end of said adjustable headrest.

4. A belt directing device for use with a smaller sized occupant or child in a vehicle having a seat with a headrest and a torso belt positioned for use with a vehicle occupant positioned on the seat, the belt directing device, comprising:
   a headrest portion having a back surface facing the seat when said headrest portion is slidably secured thereto, said headrest portion being slidably mounted to a securement member having a first securement end and a second securement end, said securement member passing through a pair of openings disposed on said back surface and said securement member defining a loop portion, said loop portion depending away from one end of said headrest portion and said first securement end and said second securement end depending away from another end of said headrest portion;
   a belt guide having an opening for receiving the torso belt when said headrest portion is slidably secured to the seat, said belt guide modifying a path of travel of the torso belt when the torso belt passes through said belt guide;
   wherein said loop portion is disposed about the headrest when said headrest portion is slidably secured to the seat.

5. The belt directing device as in claim 4, wherein said securement member is a strap having resilient qualities.

6. The belt directing device as in claim 4, wherein said loop portion wraps around the headrest when said headrest portion is slidably secured to the seat at a position below the headrest.

7. The belt directing device as in claim 4, wherein said belt guide is positioned on a side portion of said headrest portion, said side portion being disposed between said one end and said another end of said headrest portion.

8. The belt directing device as in claim 7, wherein an opening of said belt guide is positioned away from a front surface of said headrest portion.

9. The belt directing device as in claim 4, wherein said first securement end and said second securement end have a hook portion.

10. The belt directing device as in claim 9, wherein said loop portion includes a hook portion.

11. The belt directing device as in claim 10, wherein said loop portion wraps around the headrest when said headrest portion is slidably secured to the seat at a position below the headrest.

12. The belt directing device as in claim 4, wherein said loop portion includes a hook portion.

13. The belt directing device as in claim 12, wherein said loop portion wraps around the headrest when said headrest portion is slidably secured to the seat at a position below the headrest.

14. The belt directing device as in claim 12, wherein said pair of openings are a pair of elongated openings passing through an interior of said headrest portion.

15. The belt directing device as in claim 4, wherein said pair of openings are a pair of elongated openings passing through an interior of said headrest portion.

16. The belt directing device as in claim 15, wherein said pair of openings are a pair of elongated openings passing through an interior of said headrest portion and said first securement end, second securement end and said loop portion each have a hook portion.

17. A method for adjusting a seat belt for use with a smaller occupant or child of a vehicle having a seat with a headrest, the seat belt positioned for use with a larger vehicle occupant positioned on the seat, comprising;

slidably securing an adjustable headrest to the seat by wrapping a securement member of said adjustable headrest around the head rest and securing a pair of securement ends of said securement member to the vehicle, said adjustable headrest being positioned on the seat at a location below the headrest;

routing the seat belt through a belt guide affixed to said adjustable headrest; and locating the seat belt about the smaller occupant or child;

wherein the adjustable headrest is the only item secured in the vehicle.

\* \* \* \* \*